United States Patent [19]

Shedigian

[11] Patent Number: 4,538,208

[45] Date of Patent: Aug. 27, 1985

[54] ALTERNATING CURRENT CAPACITOR

[75] Inventor: Vandos Shedigian, Indianapolis, Ind.

[73] Assignee: Emhart Industries, Inc., Indianapolis, Ind.

[21] Appl. No.: 612,554

[22] Filed: May 21, 1984

Related U.S. Application Data

[63] Continuation-in-part of Ser. No. 538,090, Oct. 3, 1983, abandoned, which is a continuation of Ser. No. 336,722, Jan. 4, 1982, abandoned, which is a continuation-in-part of Ser. No. 189,126, Sep. 22, 1980, abandoned.

[51] Int. Cl.$^3$ .............................................. H01G 4/22
[52] U.S. Cl. ...................................... 361/319; 252/567
[58] Field of Search .................... 361/314, 315, 319; 252/567, 570; 29/25.42

[56] References Cited

U.S. PATENT DOCUMENTS 3,987,348 10/1976 Flanagan et al. .................... 361/319
4,345,298 8/1982 Grahame ........................ 361/315 X

FOREIGN PATENT DOCUMENTS 2446422 4/1975 Fed. Rep. of Germany ...... 361/319
538411 8/1941 United Kingdom ................. 361/319

Primary Examiner—Donald A. Griffin
Attorney, Agent, or Firm—Robert F. Meyer

[57] ABSTRACT

A method is provided for gelling a dielectric in an alternating current capacitor of the type having a housing enclosing a pair of convolutely wound electrodes and dielectric spacers interleaved therebetween for separating the electrode with at least one of the electrodes being formed by a metallized film and using a dielectric of soybean oil, the method comprising adding an alkylhydroxyphenlalkanolyhydrazine compound to the soybean oil to gel the same within the housing so as to reduce its mobility and maintain the dielectric in proximity to the electrodes for reducing electrical corona discharge between the electrodes and for reducing electrical erosion of the electrodes.

7 Claims, 2 Drawing Figures

ALTERNATING CURRENT CAPACITOR

BACKGROUND OF THE INVENTION

The present invention is a continuation-in-part of application Ser. No. 538,090, filed Oct. 3, 1983 (now abandoned) which is a continuation of Ser. No. 336,722 filed Jan. 4, 1982 (now abandoned) which is a continuation-in-part of application Ser. No. 189,126 filed Sept. 22, 1980 (now abandoned). The contents of the above applications are hereby incorporated by reference herein.

1. Field of the Invention

This invention generally relates to alternating current capacitors and, in particular, to a method of gelling a dielectric material therefor for improving performance characteristics.

2. Statement of the Prior Art

Ever since the banning of the use of polychlorinated biphenyls, much time and effort has gone into research for developing suitable alternatives for use as dielectric fluids in capacitors. For the same reason that caused the banning of polychlorinated biphenyls, namely its nonbiodegradability, special emphasis has been placed on biodegradable substances. Such biodegradable substances generally include vegetable oils such as soybean oil, which has been given a good deal of attention. Unfortunately, various problems have hindered the application of soybean oil to various forms of specialized capacitors and especially to those forms in which the dielectric material is placed under a high degree of stress. The problems with soybean oil generally include its fluidity and the mobility of conductive ions and impurities therein. It also has a high degree of absorption into certain solid dielectric materials such as polymeric film. These problems have made it especially difficult to adapt soybean oil for use in alternating current capacitors employing metallized polymeric film electrodes. The absorption of soybean oil into polymeric film, generally termed "swellability," can generally cause coating of the capacitor plates and hot spots in the capacitor. Further, ionic impurities in the soybean oil located around the ends of the roll tend to enhance electrical corona discharge between adjacent plates and allow electrode erosion induced by the corona discharge. Corona discharge is typically a problem in alternating current capacitors due to the high degree of AC voltage stress. For these reasons, soybean oil has not been acceptable for use in high stress alternating current capacitors including one or more metallized film electrodes.

SUMMARY OF THE INVENTION

Accordingly, an alternating current capacitor of the type having a housing enclosing a pair of convolutely wound electrodes, soybean oil as a dielectric means and dielectric spacer means interleaved therebetween for separating the electrodes with at least one of the electrodes being formed by a metallized film, wherein a method for improving the performance characteristics of the capacitor comprises adding a minor amount of alkylhydroxyphenylalkanolyhydrazine compound to gel the dielectric means within the housing so as to reduce its mobility and maintain the dielectric in proximity to the electrodes for reducing electrical corona discharge between the electrodes and for reducing electrical erosion of the electrodes.

BRIEF DESCRIPTION OF THE DRAWINGS

The present invention is illustratively described in respect to the appended drawings in which.

DETAILED DESCRIPTION OF THE DRAWINGS

Figure 1:
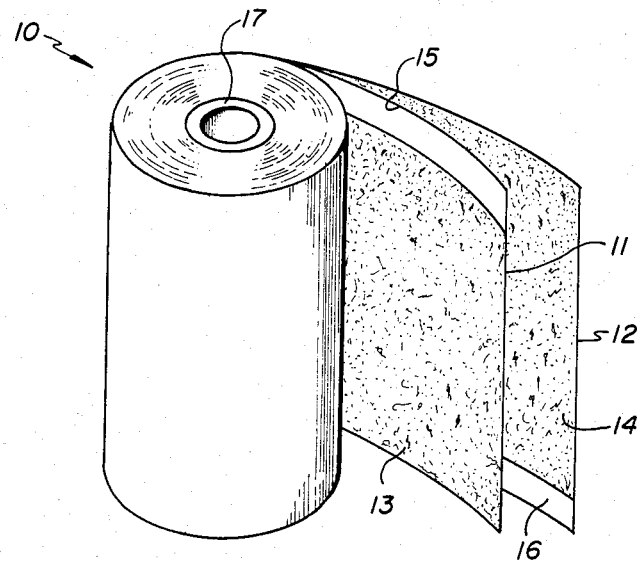
FIG. 1 is a perspective view of the electrodes of an alternating current capacitor constructed in accordance with one embodiment of the present invention.

In reference to FIG. 1, an electrode roll 10 is shown which includes dielectric spacers 11 and 12 and a pair of electrodes 13 and 14. In the present invention, at least one of the electrodes 13 or 14 is formed by a metallized film deposted on a substrate material. In the present embodiment both films are so formed and the substrates employed are the dielectric spacers 11 and 12. Generally any suitable metal such as aluminum or zinc may be used for the metallized film and any suitable material may be used as the substrates therefor. In the present embodiment, where the substrates are also dielectric material, polypropylene film is preferred although other polymeric films may also be suitable. Variations of the present invention might also allow the use of paper as a substrate material. Generally, the metallized film is deposited by means of evaporation and condensation and is done in such a manner to leave margin strips 15 and 16 uncoated.

When rolled, the dielectric material 11 and 12 and thus the electrodes 13 and 14, respectively, are offset or displaced towards the ends of the electrode roll 10 which are opposite to the uncoated margins 15 and 16 of the respective sheets. This causes a narrow strip of each electrode 13 and 14 to be exposed at the end of the roll 10 corresponding to its respective direction of displacement. Electrical contact may then be made with each electrode by the schooping or zinc spraying of each respective end. The uncoated margins 15 and 16 prevent the schooping from contacting both electrodes 13 and 14 at either end of the roll 10.

In the metallization of various polymeric films, it may be necessary to surface treat the chemically inert substrate to enhance adherence of the metallized film. This may be done by the known process of high energy electrical discharge.

At least in the case of polypropylene film being used as a dielectric material and substrate, it is important for optimizing the capacitance of the roll 10 that the winding be made tight. For this purpose, the electrodes and dielectric spacers may be wound under tension using a hollow core mandrel 17. Further tightening of the roll 10 may be obtained thereafter by heat treating the roll 10. This causes tightening by shrinkage of the polypropylene film.

Figure 2:
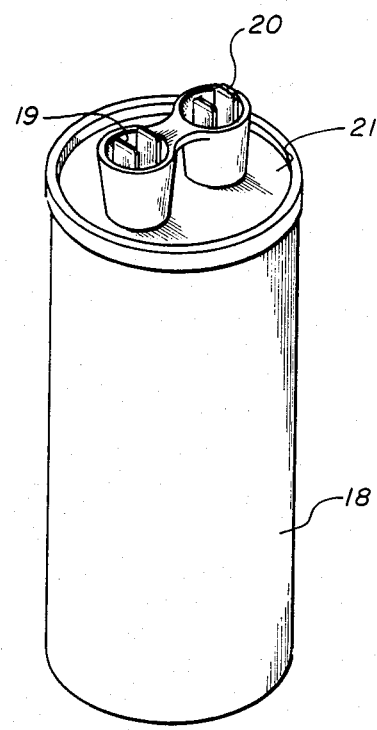
FIG. 2 is a perspective view of a completed capacitor unit including the electrode roll of FIG. 2.

After the roll 10 is properly tightened and suitable electrical connections are made to the electrodes, the roll 10 may be enclosed in a housing 18 as shown in FIG. 2. Any suitable wires may be used for electrically connecting the zinc sprayed ends of roll 10 to terminal means 19 and 20. Terminal means 19 and 20 are mounted on a cover 21 which is used for closing the housing 18. The housing is not sealed however until the remainder of the space therein is filled with a dielectric material.

The dielectric material which is added to the housing 18 and which surrounds the cylindrical roll 10 generally includes soybean oil and antioxidant additives. In one embodiment, this additive includes an alkylhydroxyphenylalkanolyhydrazine compound, more specifically known as N,N'-bis 3-(3', 5'-di-tert-butyl-4'-hydroxyphenyl) propionyl hydrazine. This compound is available from the Ciba Geigy Corporation of Ardsley, N.Y. and is sold under the tradename of Irganox MD-1024. The compound is further described in U.S. Pat. Nos. 3,773,772 and 3,660,438. This antioxidant is generally included in the dielectric in the amount of 0.1% to 1% by weight of the total weight of the dielectric means. In one embodiment, the preferred amount of this hydrazine antioxidant is approximately 0.4% by weight of the total weight of the dielectric means.

A further antioxidant additive may be added to the dielectric means of the type referred to as a butylated hydroxytoluene. More specifically, this additive may be referred to as 2,6'di-tert-butyl 4-methylphenol. One variety of this compound is sold under the tradename Ionol by the Shell Oil Company. In one embodiment, this second additive is included in an amount of approximately 0.1% by weight of the total weight of the dielectric means.

The dielectric means is generally formed by the mixing of the Irganox MD-1024 and the soybean oil with or without the Ionol in an air circulated oven at 125° C. or higher for 16 hours or longer. The elevated temperature maintains the dielectric means in a liquid form and allows its easy handling. After the dielectric means is cooled to room temperature, it takes on the form of a gel thus reducing the mobility thereof and of ionic impurities located therein. The gel form also reduces the absorbability or swellability of polymeric film when mixed with soybean oil. If the gel is heated after cooling, it again returns to the liquid state thus allowing preparation and storage prior to inclusion in the capacitor housing. Tests were run which allowed the Irganox MD-1024 and soybean mixture to cool in a partial vacuum which resulted in the same gelling of the mixture. Thus, the gelling has nothing to do with the presence or absence of oxygen. This gelling phenomena is generally due to a physical reaction between the compounds and also partially to Vanderwalls' forces.

As mentioned, the dielectric means is prepared at elevated temperatures as a liquid and is, in that state, introduced into the capacitor housing 1 to cause the displacement of air therein, after which the dielectric gels in situ. Under normal operating conditions, capacitors are rarely subject to prolonged elevated temperatures about 85° C. and thus the dielectric means remains in the gelled state maintaining the immobility of various impurities and the poor absorption thereof into the polymeric film.

Comparative tests were performed using similar capacitors except that the dielectric means in a first capacitor consisted of soybean oil with 0.1% by weight of Ionol while the second capacitor dielectric means consisted of soybean oil with 0.1% by weight of Ionol plus 0.4% by weight of Irganox MD-1024. An accelerated life test was performed at 80° C. for 1500 hours with the capacitors placed under an alternating current stress which was 25% above their general design capacity. The tests show that the first capacitor without the Irganox MD-1024 had approximately a 5.6% capacitance loss whereas the capacitor with Irganox MD-1024 exhibited only a 1.5% capacitance loss. The lower capacitance loss was generally attributed to better immobility for ionic impurities and reduced corona discharges around the end of the capacitor roll. As shown, the present invention improves the adaptability of biodegradable substances such as soybean oil for use as an alternative to nonbiodegradable and otherwise dangerous substances in the manufacturing of capacitors.

What is claimed is:

1. In an alternating current capacitor of the type having a housing enclosing a pair of convolutely wound electrodes, a dielectric including soybean oil and dielectric spacer means interleaved therebetween for separating said electrodes, with at least one of said electrodes being formed by a metallized film, a method of reducing the mobility of said dielectric and maintaining same in proximity to said electrodes which comprises adding a minor amount of an alkylhydroxyphenylalkanolyhydrazine compound to provide a gel of said soybean oil within said housing.

2. The method of claim 1 wherein said additive is N, N'-bis3-(3',5'-di-tert-butyl-4'-hydroxyphenyl) propionyl hydrazine.

3. The improvement of claim 2 wherein said additive is in an amount of from about 0.1% to 1% by weight of the total weight of the dielectric means.

4. The method of claim 3 wherein said additive is in an amount of about 0.4% by weight of the total weight of the dielectric means.

5. The method of claim 1, wherein said dielectric fluid means further includes approximately 0.1% by weight of 2,6-di-tert-butyl 4-methyl phenol.

6. The method of claim 1, wherein said metallized film is deposited on a polymeric film sheet which forms part of said dielectric spacer means.

7. The method of claim 1, wherein each of said electrodes is formed by a metallized film deposited on a separate polymeric film sheet, with said polymeric film sheet forming said dielectric spacer means.

* * * * *